United States Patent [19]

Bannai et al.

[11] Patent Number: 4,654,782
[45] Date of Patent: Mar. 31, 1987

[54] VARIABLE SEGMENT SIZE PLURAL CACHE SYSTEM WITH CACHE MEMORY UNIT SELECTION BASED ON RELATIVE PRIORITIES OF ACCESSED ENCACHED PROGRAMS

[75] Inventors: Akira Bannai; Shohei Suzuki, both of Tokyo, Japan

[73] Assignee: Tokyo Shibaura Denki Kabushiki Kaisha, Kawasaki, Japan

[21] Appl. No.: 728,459

[22] Filed: May 1, 1985

Related U.S. Application Data

[63] Continuation of Ser. No. 426,756, Sep. 29, 1982, abandoned.

[30] Foreign Application Priority Data

Feb. 26, 1982 [JP] Japan ................... 57-28731

[51] Int. Cl.[4] ............... G06F 12/08; G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,723,976 | 3/1973 | Alvarez et al. | 364/200 |
| 3,902,163 | 8/1975 | Amdahl et al. | 364/200 |
| 3,938,097 | 2/1976 | Niguette, III | 364/200 |
| 3,967,247 | 6/1976 | Anderson et al. | 364/200 |
| 3,979,726 | 9/1976 | Lange et al. | 364/200 |
| 4,087,794 | 5/1978 | Beausoleil | 364/200 |
| 4,257,097 | 3/1981 | Moran | 364/200 |
| 4,264,953 | 4/1981 | Douglas et al. | 364/200 |
| 4,268,907 | 5/1981 | Porter et al. | 364/200 |
| 4,315,312 | 2/1982 | Schmidt et al. | 364/200 |
| 4,325,120 | 4/1982 | Colley et al. | 364/200 |
| 4,332,010 | 5/1982 | Messina et al. | 364/200 |
| 4,392,201 | 7/1983 | Brown et al. | 364/200 |
| 4,426,681 | 1/1984 | Bacot et al. | 364/200 |
| 4,428,045 | 1/1984 | Davidian | 364/200 |
| 4,442,487 | 4/1984 | Fletcher et al. | 364/200 |
| 4,445,172 | 4/1984 | Peters et al. | 364/200 |
| 4,455,602 | 6/1984 | Baxter, III et al. | 364/200 |
| 4,463,424 | 7/1984 | Mattson et al. | 364/300 |
| 4,464,712 | 7/1984 | Fletcher | 364/200 |
| 4,476,526 | 10/1984 | Dodd | 364/200 |
| 4,493,026 | 1/1985 | Olnowich | 364/200 |

*Primary Examiner*—Archie E. Williams
*Attorney, Agent, or Firm*—Cushman, Darby & Cushman

[57] ABSTRACT

A cache memory control system has a segment descriptor with a 1-bit cache memory unit designation field, and a register for storing data representing the cache memory unit designation field. An output from the register is supplied to one cache memory unit, whereas inverted data of the output from the register is supplied to the other cache memory unit.

1 Claim, 5 Drawing Figures

VARIABLE SEGMENT SIZE PLURAL CACHE SYSTEM WITH CACHE MEMORY UNIT SELECTION BASED ON RELATIVE PRIORITIES OF ACCESSED ENCACHED PROGRAMS

This is a continuation of application Ser. No. 426,756, filed Sept. 29, 1982, now abandoned.

BACKGROUND OF THE INVENTION

The present invention relates to a cache memory control system suitable for a data processing device which adopts a segmentation system.

In a data processing device, the operation speed of a main memory unit is slower than the command processing speed of a central processing unit (CPU). In order to prevent a decrease in the processing speed due to the data access of the main memory unit, a high-speed memory called a cache memory is generally arranged to store a copy of part of the data stored in the main memory unit.

In the data processing device of the above architecture, various procedures are proposed to increase a hit ratio of data in the cache memory to the master data in the main memory unit when the CPU accesses data from the cache memory, so as to improve the processing efficiency in cooperation with the cache memory.

For example, the capacity of the cache memory is increased so as not to frequently require substitution. Invalid data in the cache memory is decreased.

Furthermore, in order to decrease parallel access of the processing units (the instruction decoder and the arithmetic and logic unit) in the CPU, a data processing device is proposed wherein an instruction cache memory and data cache memory are separately utilized.

FIG. 1 is a block diagram of a conventional data processing device which has separate instruction and data cache memories. A central processing unit (CPU) 11 and a main memory unit 12 are connected through a memory bus 13. The CPU 11 is functionally subdivided into an instruction decoder 104 and an arithmetic and logic unit 102 which are respectively connected to the memory bus 13 through an instruction cache memory 14 and a data cache memory 15. In this case, the hardware logic determines the use of one of the cache memories according to the status of whether or not the memory access is initiated in the instruction read. The above operation is generally performed independently of the software.

In such a data processing device, however, after an operating system (to be referred to as an OS program hereinafter) runs and the user program is initiated, the OS is removed from the cache memories 14 and 15. When the user program is finished and the user wishes to return to the OS again, the OS is no longer loaded in the cache memories 14 and 15.

FIG. 2 is a block diagram of another example of a conventional data processing device. In this data processing device, the OS may not be removed from the cache memories even if the user program is initiated since an OS cache memory 24 and a user program cache memory 25 are arranged.

However, even in this second example of the conventional data processing device, the OS is too long to be stored in the OS cache memory 24 all at once. Therefore, when the OS is loaded and then the user program is initiated, only the final block of the OS is left in the OS cache memory 24. When the user program is finished and the user wishes to reload the OS, the first block of the program is not present in the OS cache memory 24.

In another example utilized for cache memory selection, since data of the OS is often fixed in a memory location (or in a virtual storage space when the virtual storage system is adopted), it is checked whether the memory addresses generated for the memory access are located in a predetermined range so as to select the desired cache memory.

The desired cache memories are assigned in a predetermined storage area of the memory when the OS is created. However, it is inconvenient to modify the OS.

SUMMARY OF THE INVENTION

The present invention has been made to eliminate the above drawbacks and has for its object to provide a cache memory control system with high efficiency.

In order to achieve the above object of the present invention, there is provided a cache memory control system suitable for a data processing device which adopts a segmentation system, comprising:

segment descriptor means which has a cache memory unit designation field; and selecting means for selecting a single cache memory unit on the basis of data in the cache memory unit designation field.

BRIEF DESCRIPTION OF THE DRAWINGS

Other objects and features of the present invention will be apparent from the following description taken in connection with the accompanying drawings in which.

DETAILED DESCRIPTION OF THE PREFERRED EMBODIMENT

A cache memory control system according to an embodiment of the present invention will be described in detail with reference to FIGS. 3 to 5. The program used for the data processing apparatus of the type as described above is constituted by a set of segments as the logical storage units in a memory (virtual storage space when the data processing apparatus adopts a virtual storage system). Each segment is defined by a special data structure called a segment descriptor.

Figure 1:
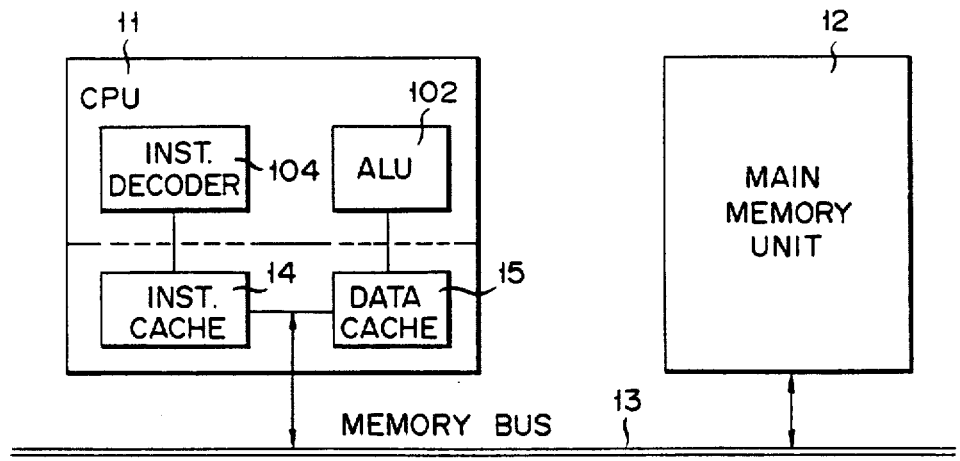
FIG. 1 is a block diagram of an example of the conventional cache memory control system.
Figure 2:
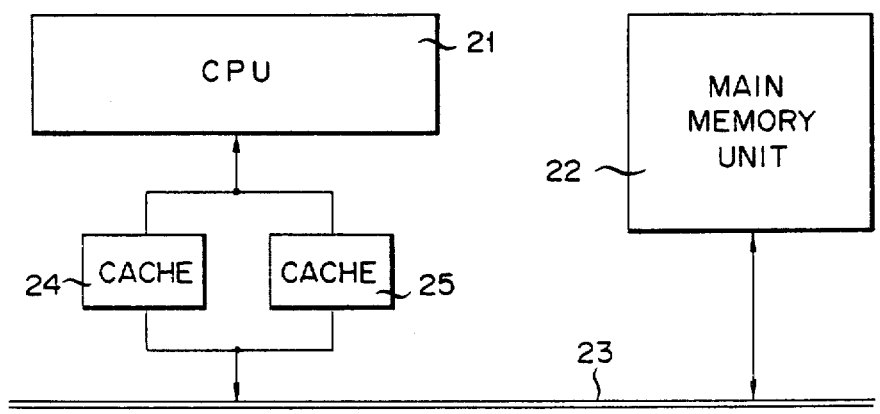
FIG. 2 is a block diagram of another example of the conventional cache memory control system.
Figure 3:
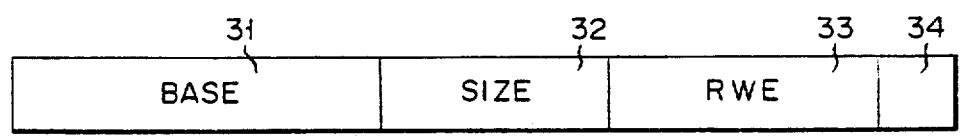
FIG. 3 shows a format of a segment descriptor used according to an embodiment of the present invention.

FIG. 3 shows an example of a segment descriptor used in the present invention. A base field 31 designates the start address of the segment in the memory. A size field 32 designates the size of the segment. A flag field 33 designates, for example, read, write or execute. A field 34 is the field added specifically according to the present invention and designates a certain cache memory unit among a plurality of cache memory units when the segment is accessed according to the data in the field 34.

Figure 4:
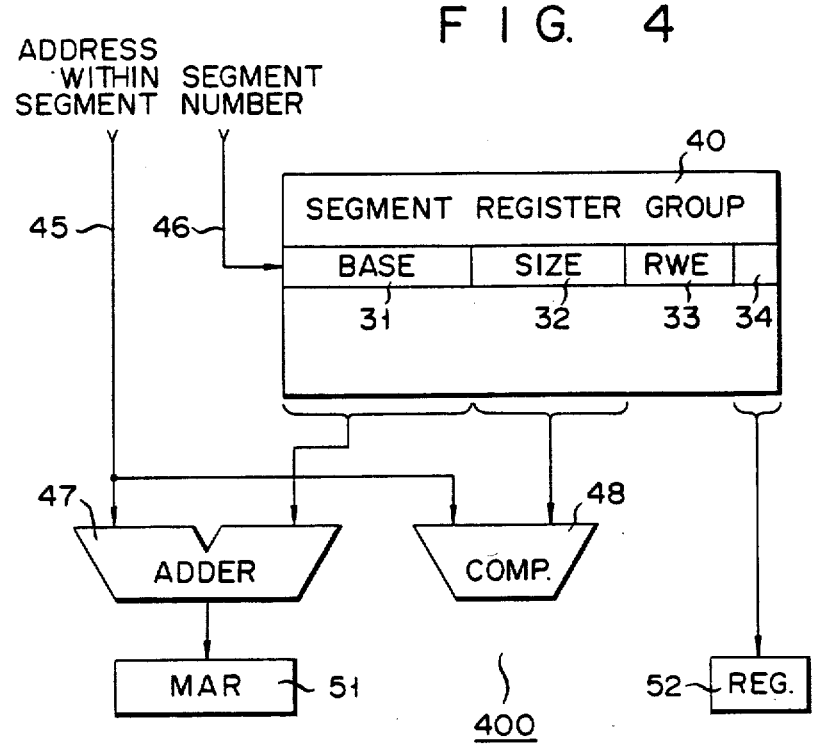
FIG. 4 is a block diagram of a cache memory control system according to the embodiment of the present invention.
Figure 5:
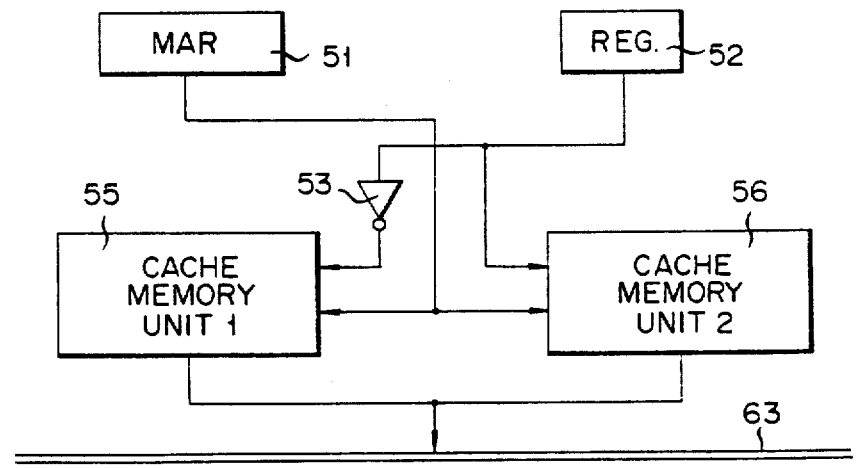
FIG. 5 shows a model for explaining the mode of operation wherein one of a plurality of cache memory units (two in this embodiment) is accessed by a memory address generated by the cache memory control system according to an embodiment of the present invention.

FIG. 4 is a block diagram of the cache memory control system according to an embodiment of the present invention. A segment descriptor required for referring to the memory is preloaded in a register in a segment register group 40 and makes such reference in accordance with a segment number supplied through a line 46. A segment register corresponding to the accessed segment number is selected, and data is read out from the base field 31 of this segment register, the size field 32, and the cache memory unit designation field 34. As a result, the storage content in the base field 31 is supplied through a line 45 to an adder 47 which also receives the start address of the segment. The memory address from the adder 47 is supplied to a memory address register 51. The storage content in the size register 32 is supplied to a comparator 48 and is compared therein with the size of the segment. Thus, the size check is performed. The storage content of the cache memory unit designation field 34 is supplied to a cache memory unit designation register 52. The register 52 comprises only one bit when the cache memory is subdivided into OS and user program cache memory units. The memory address held in the memory address register 51 is supplied to cache memory units 55 and 56 shown in FIG. 5. Data from the cache memory unit designation register 52 is supplied as a bias signal to the cache memory unit 56. The data from the cache memory unit designation register 52 is also supplied to an inverter 53 whose output is supplied as a bias signal to the cache memory unit 55. If the storage content in the register 52 is set to logic "1", the cache memory unit 56 is selected. However, if the data in the register 52 is set to logic "0", the cache memory unit 55 is selected.

With the above architecture, unlike the conventional cache memory control system, the cache memory units need not be assigned as the OS and user program cache memory units respectively. The OS can be copied into the memory area extending from one cache memory unit to the other cache memory unit. Thus, more effective cache memory utilization can be accomplished.

What we claim is:

1. A cache memory control system suitable for a data processing device including a main memory unit for storing programs divided into segments which correspond to a logical unit of storage and a central processing unit coupled to the main memory unit via a memory bus, said cache memory control system comprising:

first and second cache memory units each being comprised of any of full-associative, set-associative, or direct-map cache memory units, and each storing a part of the contents of said main memory unit in such a way that one of said first and second cache memory units stores a system program or user program with higher priority and the other cache memory unit stores a system program with lower priority;

segment descriptor means including a base field for specifying the start address of a corresponding program segment in said main memory, a size field for specifying the size of the segment, a read/write field for specifying a read operation or write operation, an enable/disable field for specifying the enable or disable of the access to said cache memory units, and a cache memory unit selection field for selecting one of said first and second cache memory units depending on the access of the system or user program with higher or lower priority;

cache memory unit address generating means for generating a cache address for one of said cache memory units based on the contents of said base field of said segment descriptor means and an address in a segment, which corresponds to the program to be accessed and is supplied from said central processing unit; and means for supplying the contents of said cache memory unit selection field of said segment descriptor means to said first cache memory unit and supplying the inverted contents of said cache memory unit selection field to said second cache memory unit, thereby selecting one of said first and second cache memory units.

* * * * *